United States Patent
Lee et al.

(10) Patent No.: US 8,974,667 B2
(45) Date of Patent: Mar. 10, 2015

(54) MODULE CASE AND HOLLOW FIBER MEMBRANE MODULE USING THE SAME

(75) Inventors: Kwang-Jin Lee, Yongin-si (KR); Moo-Seok Lee, Seoul (KR); Yong-Cheol Shin, Seoul (KR)

(73) Assignee: Kolon Industries Inc., Kwacheon-si (KR)

( * ) Notice: Subject to any disclaimer, the term of this patent is extended or adjusted under 35 U.S.C. 154(b) by 407 days.

(21) Appl. No.: 13/376,124

(22) PCT Filed: Jun. 3, 2010

(86) PCT No.: PCT/KR2010/003583
§ 371 (c)(1),
(2), (4) Date: Dec. 2, 2011

(87) PCT Pub. No.: WO2010/140857
PCT Pub. Date: Dec. 9, 2010

(65) Prior Publication Data
US 2012/0097601 A1    Apr. 26, 2012

(30) Foreign Application Priority Data
Jun. 5, 2009 (KR) .......................... 10-2009-0049766

(51) Int. Cl.
*B01D 63/02*    (2006.01)

(52) U.S. Cl.
CPC ............ *B01D 63/022* (2013.01); *B01D 63/021* (2013.01); *B01D 2313/02* (2013.01); *B01D 2313/21* (2013.01)
USPC ................ 210/321.8; 210/321.6; 210/321.79; 210/455; 210/495; 210/500.23

(58) Field of Classification Search
CPC ........... B01D 2313/02; B01D 2313/21; B01D 63/022; B01D 63/021
USPC ................ 210/321.6, 321.79, 321.8, 321.88, 210/321.89, 455, 500.23, 495

See application file for complete search history.

(56) References Cited

U.S. PATENT DOCUMENTS 5,472,601 A * 12/1995 Eguchi ........................ 210/321.8
6,331,248 B1   12/2001 Taniguchi et al.
(Continued)

FOREIGN PATENT DOCUMENTS

JP    05-049875 A    3/1993
JP    2004-283807 A   10/2004
(Continued)

OTHER PUBLICATIONS

English translation Japanese Patent Application No. 05-049875 (1993).*
English translation Japanese Patent Application No. 2004-283807 A (2004).*

*Primary Examiner* — John Kim
(74) *Attorney, Agent, or Firm* — Birch, Stewart, Kolasch & Birch, LLP (57) ABSTRACT

A hollow fiber membrane module is disclosed, which is capable of preventing a bundle of hollow fiber membranes from being separated from a module case, the hollow fiber membrane module for accommodating a bundle of hollow fiber membranes closely held together through the use of potting agent, including a module case including: a first inner surface serving as a projection on which the bundle of hollow fiber membranes is stably placed; a second inner surface upwardly extending from one end of the first inner surface, the second inner surface including at least one separation-preventing groove to prevent the bundle of hollow fiber membranes from being separated from the module case; a third inner surface downwardly extending from the other end of the first inner surface; and a fourth inner surface connected to the third inner surface.

8 Claims, 7 Drawing Sheets

(56) References Cited

U.S. PATENT DOCUMENTS

| | | | |
|---|---|---|---|
| 6,974,554 B2* | 12/2005 | Cox et al. | 264/40.6 |
| 7,160,455 B2* | 1/2007 | Taniguchi et al. | 210/321.88 |
| 8,518,256 B2* | 8/2013 | Cox et al. | 210/321.89 |
| 2005/0194305 A1* | 9/2005 | Vido et al. | 210/321.88 |
| 2010/0038301 A1* | 2/2010 | Lee et al. | 210/321.6 |

FOREIGN PATENT DOCUMENTS

| | | |
|---|---|---|
| JP | 2007-175566 A | 7/2007 |
| KR | 10-0246013 B1 | 3/2000 |

\* cited by examiner

FIG.1

PRIOR ART

Fig. 9

MODULE CASE AND HOLLOW FIBER MEMBRANE MODULE USING THE SAME

TECHNICAL FIELD

The present invention relates to a hollow fiber membrane module used for a water treatment, and more particularly, to a hollow fiber membrane module capable of preventing a bundle of hollow fiber membranes from being separated from a module case.

BACKGROUND ART

A water treatment for cleaning fluid by removing pollutants therefrom may use a heating method, a phase-changing method, or a separation method using a membrane.

The separation method using a membrane has lots of advantages over the method based on heating or phase-changing. Among the advantages is high reliability of water treatment since the water purity required can be easily and stably satisfied by adjusting the size of the pores of a membrane. Furthermore, since the separation method using a membrane does not require a heating process, a membrane can be used with microorganism which is useful for separation process but may be adversely affected by heat.

The separation membrane may include a flat-type membrane, and a hollow fiber membrane. In case of the hollow fiber membrane, there are micro-pores provided on a surface of tubular fiber structure, so that pollutants are filtered through the micro-pores included in the hollow fiber membrane. In comparison to the flat-type membrane, the hollow fiber membrane has the larger surface area owing to its inner and outer surfaces. Accordingly, owing to the advantageous characteristics such as the large surface area of hollow fiber membrane, the hollow fiber membrane is widely utilized for the separation membrane in the recent applications of water treatment.

The hollow fiber membranes, which are manufactured as a predetermined-shaped module, are used for a water treatment field. A related art hollow fiber membrane module will be described as follows.

Figure 1:
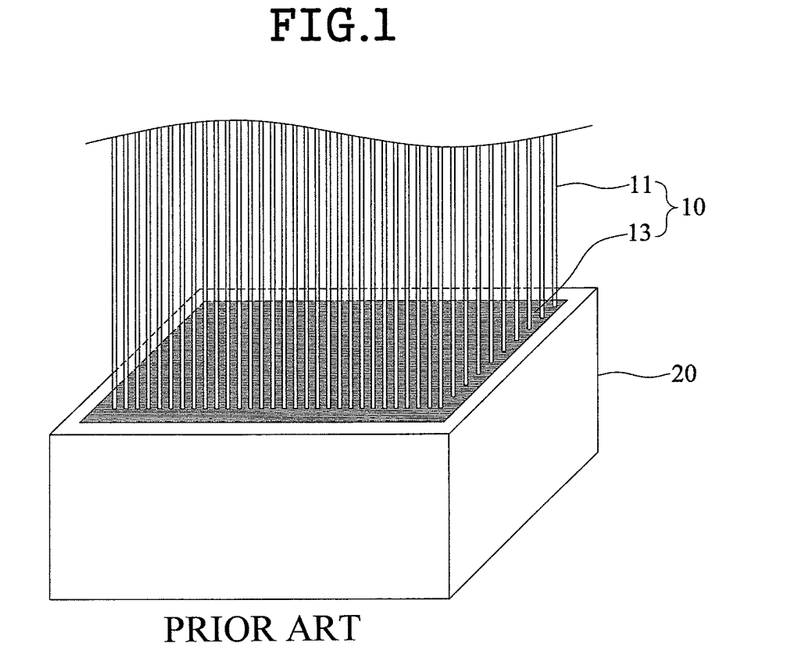
FIG. 1 is a perspective view illustrating a related art hollow fiber membrane module.

FIG. 1 is a perspective view illustrating the related art hollow fiber membrane module.

As shown in FIG. 1, the related art hollow fiber membrane module includes a bundle 10 of hollow fiber membranes, and a module case 20.

The bundle 10 of hollow fiber membranes is formed by closely holding plural hollow fiber membranes 11 through the use of potting agent 13. At this time, one end of each of the plural hollow fiber membranes 11 is open so that water permeated through hollows of the hollow fiber membranes 11 is collected inside the module case 20. The potting agent 13 enables to form the bundle 10 by closely holding the plural hollow fiber membranes 11, and simultaneously to pot the bundle 10 of hollow fiber membranes into the inside of the module case 20.

The module case 20 accommodates the bundle 10 of hollow fiber membranes therein, and collects the water permeated through the hollow fiber membranes 11.

However, the related art hollow fiber membrane module is disadvantageous in that the bundle 10 of hollow fiber membranes is apt to be separated from the module case 20 during a module-manufacturing process. In order to pot the bundle 10 of hollow fiber membranes into the inside of the module case 20, the plural hollow fiber membranes 11 are closely held into the bundle 10 through the use of potting agent 13; the bundle 10 of hollow fiber membranes is placed in the module case 20, and is filled with the potting agent 13; and the filled potting agent 13 is hardened. During the hardening process of the potting agent 13, the potting agent 13 might be expanded or shrunken, which cause a reduction of adhesive strength between the bundle 10 of hollow fiber membranes and the module case 20.

Also, the bundle 10 of hollow fiber membranes may be separated from the module case 20 during a water-treatment process. In more detail, if carrying out the water-treatment process through the use of hollow fiber membrane module, the hollow fiber membrane module is submerged in water of a tank for a long period of time. In this case, the adhesive strength between the bundle 10 of hollow fiber membranes and the module case 20 may be reduced due to pressure inside the tank. Especially, when an aeration process for removing pollutants from the hollow fiber membranes 11 is carried out during the water-treatment process, the adhesive strength between the bundle 10 of hollow fiber membranes and the module case 20 may be reduced due to a vibration occurring during the aeration process.

As mentioned above, if the adhesive strength is reduced between the bundle 10 of hollow fiber membranes and the module case 20, the bundle 10 of hollow fiber membranes may be separated from the module case 20, whereby the related art hollow fiber membrane module may malfunction.

DISCLOSURE

Technical Problem

Therefore, the present invention has been made in view of the above problems, and it is an object of the present invention to provide a module case and a hollow fiber membrane module using the same, which is capable of preventing one or more problems of the related art.

Another object of the present invention is to provide a module case with a new structure capable of preventing the separation of a bundle of hollow fiber membranes, even though an adhesive strength therebetween is reduced, and a hollow fiber membrane module using the module case.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a module case for accommodating a bundle of hollow fiber membranes closely held together through the use of potting agent, comprises a first inner surface serving as a projection on which the bundle of hollow fiber membranes is stably placed; a second inner surface upwardly extending from one end of the first inner surface, the second inner surface including at least one separation-preventing groove to prevent the bundle of hollow fiber membranes from being separated from the module case; a third inner surface downwardly extending from the other end of the first inner surface; and a fourth inner surface connected to the third inner surface.

At this time, the separation-preventing groove comprises an inlet provided on an extended surface of the second inner surface; and a room for defining the separation-preventing groove together with the inlet, wherein, on assumption that a width is defined with reference to a line parallel to the second inner surface, a width of the room is larger than a width of the inlet.

The separation-preventing groove comprises a first inlet provided on an extended surface of the second inner surface; and a first room, a second inlet, and a second room sequentially arranged after the first inlet, wherein, on assumption that a width is defined with reference to a line parallel to the second inner surface, a width of the second room is larger than a width of the second inlet.

The separation-preventing groove is formed from one end of the second inner surface to the other end of the second inner surface along a longitudinal direction of the hollow fiber membrane.

The module case has a polygonal-shaped or curvilinear-shaped cross section when the module case is cut in a direction perpendicular to the longitudinal direction of the hollow fiber membrane.

In another aspect of the present invention, a hollow fiber membrane module comprises a module case comprising a first inner surface serving as a projection on which the bundle of hollow fiber membranes is stably placed, a second inner surface upwardly extending from one end of the first inner surface, the second inner surface including at least one separation-preventing groove to prevent the bundle of hollow fiber membranes from being separated from the module case, a third inner surface downwardly extending from the other end of the first inner surface, and a fourth inner surface connected to the third inner surface; a bundle of hollow fiber membranes closely held together through the use of first potting agent, the bundle of hollow fiber membranes being placed on the first inner surface of the module case; and a second potting agent for potting the bundle of hollow fiber membranes into the module case, wherein the second potting agent is filled in the separation-preventing groove of the module case.

The first potting agent may be in contact with the first and second inner surfaces of the module case.

The first potting agent may be in contact with the first and third inner surfaces of the module case.

The first potting agent may be not in contact with the second inner surface of the module case.

The module case may comprise a first module case for accommodating one end of the hollow fiber membrane module; and a second module case for accommodating the other end of the hollow fiber membrane module.

Advantageous Effects

According to the present invention, separation-preventing grooves are formed in an inner surface of a module case, and are filled with a potting agent for potting a bundle of hollow fiber membranes into the module case. Thus, even though an adhesive strength between the potting agent and the module case is reduced, the potting agent filled in the separation-preventing grooves prevents the bundle of hollow fiber membranes from being separated from the module case.

BEST MODE

Reference will now be made in detail to the preferred embodiments of the present invention, examples of which are illustrated in the accompanying drawings. Wherever possible, the same reference numbers will be used throughout the drawings to refer to the same or like parts.

Hereinafter, a module case according to the present invention and a hollow fiber membrane module using the same will be described with reference to the accompanying drawings.

Figure 2:
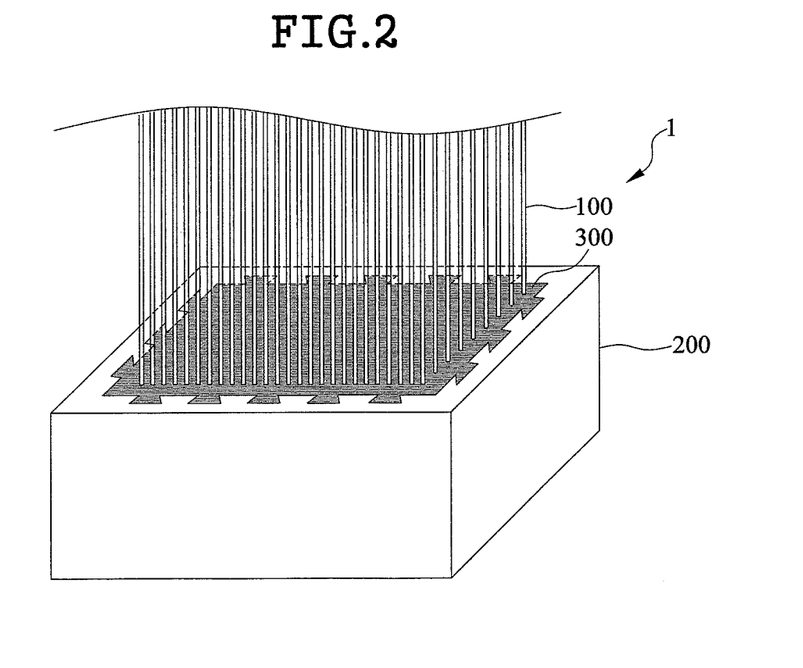
FIG. 2 is a perspective view illustrating a hollow fiber membrane module according to one embodiment of the present invention.
Figure 3:
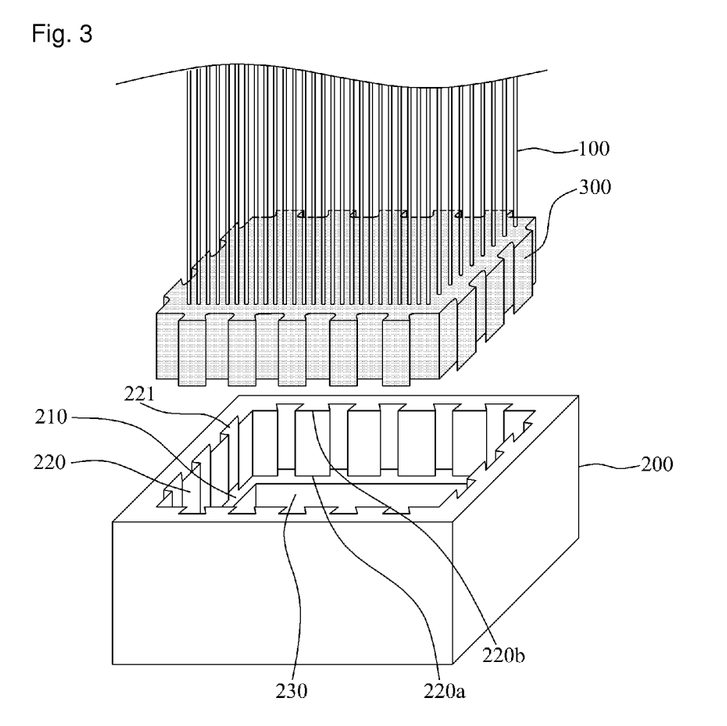
FIG. 3 is an exploded perspective view illustrating a hollow fiber membrane module according to one embodiment of the present invention.

FIG. 2 is a perspective view illustrating a hollow fiber membrane module according to one embodiment of the present invention. FIG. 3 is an exploded perspective view illustrating a hollow fiber membrane module according to one embodiment of the present invention.

As shown in FIGS. 2 and 3, the hollow fiber membrane module 1 according to one embodiment of the present invention includes plural hollow fiber membranes 100, a module case 200, and a potting agent 300.

The plural hollow fiber membranes 100 are collected in a bundle. That is, the plural hollow fiber membranes 100 are closely held in the bundle through the use of potting agent 300.

At this time, one end of each of the plural hollow fiber membranes 100 is open so that water permeated through hollows of the hollow fiber membranes 100 is collected inside the module case 200.

The potting agent 300 enables to form the bundle by closely holding the plural hollow fiber membranes 100, and simultaneously to pot the bundle of hollow fiber membranes 100 into the inside of the module case 200. As explained in the following, the potting agent 300 comprises a first potting agent for closely holding the plural hollow fiber membranes 100 in the bundle, and a second potting agent for potting the bundle of hollow fiber membranes 100 into the inside of the module case 200.

The potting agent 300 comprising the first and second potting agents is formed of urethane-based resin or epoxy-based resin, but it is not limited to these materials.

The water permeated through the hollow fiber membranes 100 is collected in the module case 200. A detailed structure of the module case 200 will be explained with reference to FIGS. 4A to 4C.

Figure 4:
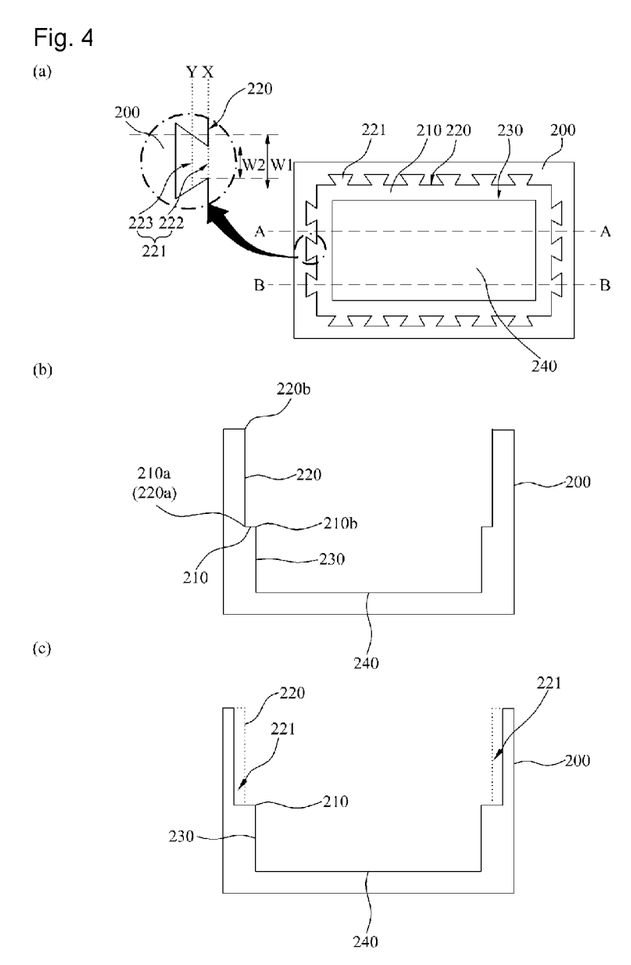
FIG. 4A is a plan view illustrating a module case according to one embodiment of the present invention.
FIG. 4B is a cross section view along A-A of FIG. 4A.
FIG. 4C is a cross section view along B-B of FIG. 4A.

FIG. 4A is a plan view illustrating the module case according to one embodiment of the present invention. FIG. 4B is a cross section view along A-A of FIG. 4A. FIG. 4C is a cross section view along B-B of FIG. 4A.

Referring to FIG. 3 and FIGS. 4A to 4C, the module case 200 includes a first inner surface 210, a second inner surface 220, a third inner surface 230, and a fourth inner surface 240. That is, the module case 200 has an inner space for accommodating the bundle of hollow fiber membranes 100, and simultaneously collecting the water permeated through the hollow fiber membranes 100 therein. This inner space of the module case 200 is defined by the first inner surface 210, the second inner surface 220, the third inner surface 230, and the fourth inner surface 240.

The first inner surface 210 functions as a projection on which the bundle including the plural hollow fiber membranes 100 is placed thereon. Also, the bundle of hollow fiber membranes 100 is potted into the first inner surface 210 together with the second inner surface 220.

The second inner surface 220 is upwardly extended from one end of the first inner surface 210 along a longitudinal direction of the hollow fiber membrane 100.

According as the potting agent 300 is potted into the first and second inner surfaces 210 and 220, the bundle of hollow fiber membranes 100 is accommodated in and potted into the inside of the module case 200.

The second inner surface 220 is provided with a separation-preventing groove 221 which prevents the bundle of hollow fiber membranes 100 from being separated from the module case 200. That is, since the separation-preventing groove 221 is formed in the second inner surface 220, the separation-preventing groove 221 is filled with the potting agent 300, so that the potting agent 300 filled in the separation-preventing groove 221 prevents the bundle of hollow fiber membranes 100 from being separated from the module case 200.

As shown in the drawings, if the module case 200 is a quad structure, there are four of the second inner surfaces 220, wherein the separation-preventing groove 221 is formed in each of the four of the second inner surfaces 220, but it is not limited to this structure. For example, one, two or more separation-preventing grooves 221 may be formed in each of the four of the second inner surfaces; and a size of the separation-preventing groove 21 may be changeable properly. In order to increase a contact area between the potting agent 300 and the separation-preventing groove 221, the separation-preventing groove 221 is formed along the longitudinal direction of the hollow fiber membrane 100, that is, the separation-preventing groove 221 is formed from one end 220a of the second inner surface 220 to the other end 220b of the second inner surface 220, preferably.

Referring to an expanded part of FIG. 4A, the separation-preventing groove 221 comprises an inlet 222 and a room 223. The inlet 222 is provided on an extended surface (X-line) of the second inner surface 220; and the room 223 is an empty space inside the inlet 222, wherein both the inlet 222 and room 223 define the separation-preventing groove 221. At this time, a shape of the separation-preventing groove 221 depends on a shape of the room 223. A preferable shape of the room 223 will be explained as follows.

When defining a width with reference to a line (Y-line) parallel to the second inner surface 220, a width (W1) of the room 223 is larger than a width (W2) of the inlet 222, preferably. That is, if the width (W1) of the room 223 is larger than the width (W2) of the inlet 222, the inlet 222 is clogged with the potting agent 300 filled in the room 223, to thereby prevent the separation. For this, the room 223 may be formed in a trapezoid shape shown in FIG. 4A, but it is not limited to this shape. For example, the room 223 may vary in shape, as shown in FIGS. 5B to 5C.

Figure 5:
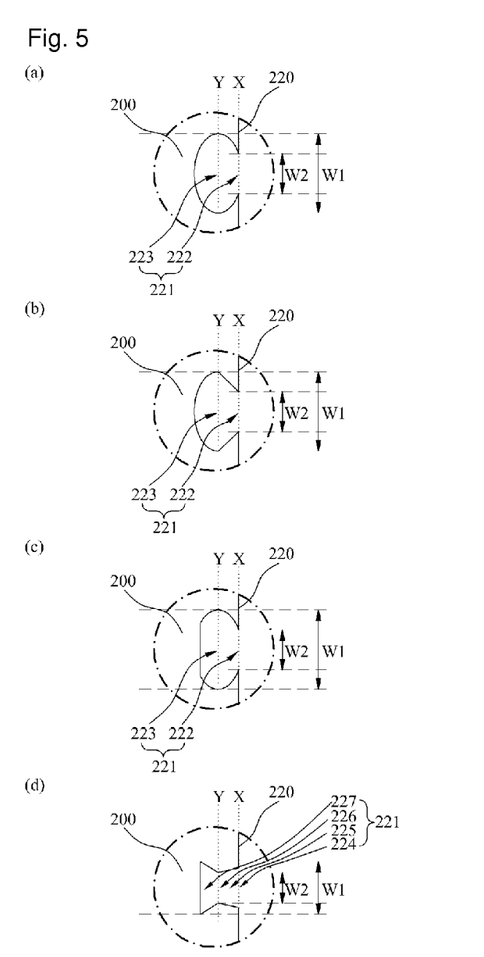
FIGS. 5A to 5D illustrate separation-preventing grooves according to various embodiments of the present invention.

Also, as shown in FIG. 5D, the separation-preventing groove 221 may comprise a first inlet 224, a first room 225, a second inlet 226, and a second room 227 arranged in sequence, wherein the first inlet 224 is provided on an extended surface (X-line) of the second inner surface 220. In this case, when defining a width with reference to a line (Y-line) parallel to the second inner surface 220, a width (W1) of the second room 227 is larger than a width (W2) of the second inlet 226, preferably. That is, as shown in FIG. 5D, since a width of the first room 225 is smaller than a width of the first inlet 224, the width (W1) of the second room 227 is larger than the width (W2) of the second inlet 226.

The separation-preventing groove 221 may be formed in any structure capable of preventing the bundle of hollow fiber membranes 100 from being separated from the module case 200 within the technical scope of the present invention.

Referring once again to FIGS. 4A to 4C, the third inner surface 230 is downwardly extended from the other end 210b of the first inner surface 210; and the fourth inner surface 240 is connected to the third inner surface 230 so as to form the bottom surface of the module case 200.

A water-collecting space for collecting the water permeated through the hollow fiber membranes 100 is prepared by connecting the third inner surface 230 to the fourth inner surface 240. Although not shown, a discharge pipe for discharging the permeated water, collected in the water-collecting space, may be connected to the third inner surface 230 or fourth inner surface 240.

The aforementioned hollow fiber membrane module according to one embodiment of the present invention, especially the potting agent 300 therein will be easily understood with reference to the following process for manufacturing the hollow fiber membrane module.

Figure 6:
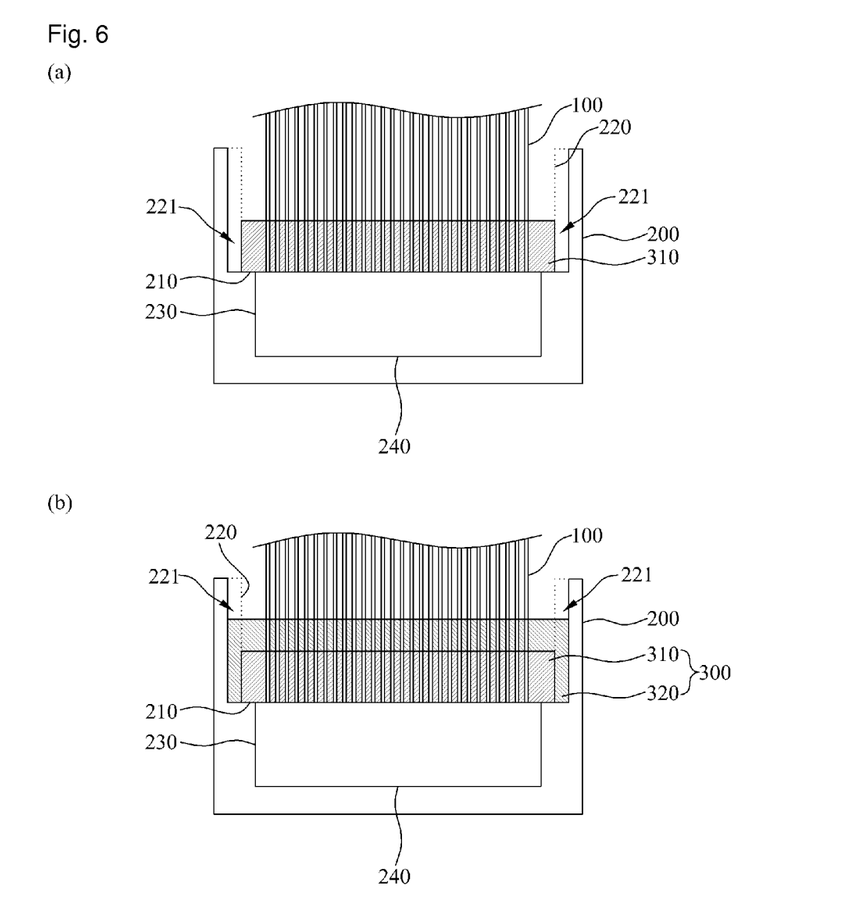
FIGS. 6A to 6B are cross section views illustrating a method for manufacturing a hollow fiber membrane module according to one embodiment of the present invention.

FIGS. 6A to 6B are cross section views illustrating a method for manufacturing the hollow fiber membrane module according to one embodiment of the present invention, which correspond to cross section views along B-B of FIG. 4A. Wherever possible, the same reference numbers will be used throughout the drawings to refer to the same or like parts.

First, as shown in FIG. 6A, the bundle of hollow fiber membranes 100 is placed in the module case 200.

The bundle of hollow fiber membranes 100 is formed by closely holding the plural hollow fiber membranes 100 through the use of first potting agent 310. The bundle of hollow fiber membranes 100 is placed onto the first inner surface 210 of the module case 200, wherein the first inner surface 210 functions as the projection for stably placing the bundle of hollow fiber membranes 100 thereon. Accordingly, a lower surface of the first potting agent 310 is in contact with the first inner surface 210. Also, a lateral surface of the first potting agent 310 is in contact with the second inner surface 220.

Even though the bundle of hollow fiber membranes 100 is placed in the module case 200, the bundle of hollow fiber membranes 100 is not potted into the module case 200. That is, the first potting agent 310 is not potted into the first inner surface 210 and second inner surface 220, but is brought into contact with the first inner surface 210 and second inner surface 220. This is because the bundle of hollow fiber membranes 100 is just placed on the module case 200 after the bundle is prepared by holding the plural hollow fiber membranes 100 with the first potting agent 310 outside the module case 200.

In the following FIG. 6B, the bundle of hollow fiber membranes 100 is potted into the module case 200 through the use of second potting agent 320.

As shown in FIG. 6B, the second potting agent 320 is filled between the bundle of hollow fiber membranes 100 and the module case 200, whereby the bundle of hollow fiber membranes 100 is potted into the module case 200.

The second potting agent 320 is formed at upper and lateral sides of the first potting agent 310. Especially, the second potting agent 320 is filled in the separation-preventing groove 221 of the second inner surface 210 of the module case 200, so that it is possible to prevent the bundle of hollow fiber membranes 100 from being separated from the module case 200.

As mentioned above, the first potting agent 310 is provided to form the bundle by holding the plural hollow fiber membranes 100; and the second potting agent 320 is provided to pot the bundle of hollow fiber membranes 100 into the module case 200. That is, the first potting agent 310 and the second potting agent 320 constitute the potting agent 300.

The first potting agent 310 and the second potting agent 320 may be formed of the same material, or may be formed of the different materials.

Figure 7:
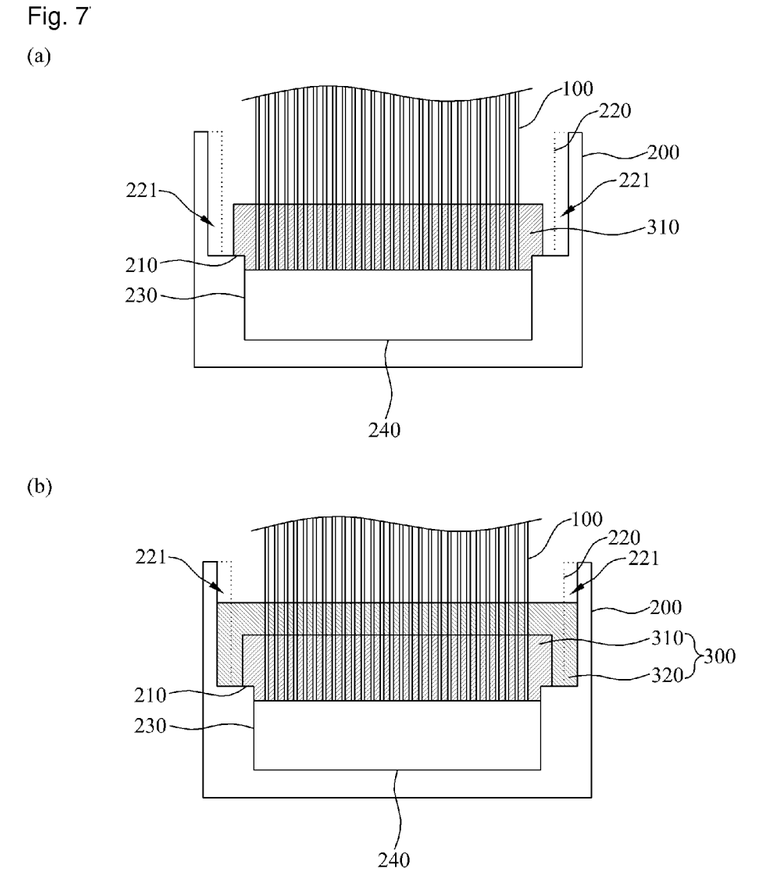
FIGS. 7A and 7B are cross section views illustrating a method for manufacturing a hollow fiber membrane module according to another embodiment of the present invention.

FIGS. 7A and 7B are cross section views illustrating a method for manufacturing the hollow fiber membrane module according to another embodiment of the present invention. In comparison to the aforementioned method shown in FIGS. 6A and 6B, the method of FIGS. 7A and 7B enables the further improved adhesive strength between the bundle of hollow fiber membranes 100 and the module case 200.

First, as shown in FIG. 7A, the bundle of hollow fiber membranes 100 is placed in the module case 200.

The bundle of hollow fiber membranes 100 is formed by closely holding the plural hollow fiber membranes 100 through the use of first potting agent 310. The bundle of hollow fiber membranes 100 is placed onto the first inner surface 210 of the module case 200.

In this case, the first potting agent 310 is in contact with the first inner surface 210 of the module case 200, and is in contact with the third inner surface 230 without contact with the second inner surface 220.

Then, as shown in FIG. 7B, the second potting agent 320 is filled between the bundle of hollow fiber membranes 100 and the module case 200, whereby the bundle of hollow fiber membranes 100 is potted into the module case 200.

The second potting agent 320 is formed at upper and lateral sides of the first potting agent 310. Especially, the second potting agent 320 is filled in the separation-preventing groove 221 of the second inner surface 210 of the module case 200, so that it is possible to prevent the bundle of hollow fiber membranes 100 from being separated from the module case 200.

At this time, the method shown in FIGS. 7A and 7B can obtain the further increased contact area between the second potting agent 320 and the first inner surface 210 of the module case 200, as compared to the aforementioned method shown in FIGS. 6A and 6B, whereby the adhesive strength between the bundle of hollow fiber membranes 100 and the module case 200 can be further improved.

As mentioned above, since the first potting agent 310 is additionally brought into contact with the third inner surface of the module case 230, it is possible to obtain the further lowered possibility of separation between the bundle of hollow fiber membranes 100 and the module case 200, as compared to the aforementioned method shown in FIGS. 6A and 6B.

Figure 8:
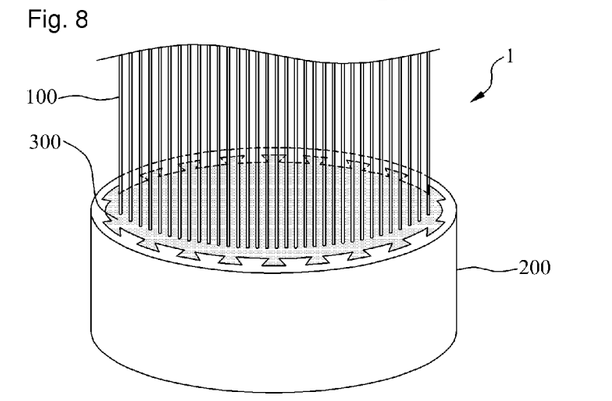
FIG. 8 is a perspective view illustrating a hollow fiber membrane module according to another embodiment of the present invention.

FIG. 8 is a perspective view illustrating a hollow fiber membrane module according to another embodiment of the present invention. Except that the module case is formed in a circle shape, the hollow fiber membrane module of FIG. 8 is identical to the aforementioned hollow fiber membrane module according to one embodiment of the present invention, whereby the same reference numbers will be used throughout the drawings to refer to the same or like parts, whenever possible, and a detailed explanation for the same parts will be omitted.

Referring to FIG. 8, when cutting the module case 200 in a direction perpendicular to the longitudinal direction of the hollow fiber membrane 100, the module case 200 has a circle-shaped cross section. Instead of the circle-shaped cross section, the module case 200 may have an oval-shaped cross section, or various shapes with curved lines. Also, the module case 200 may have various polygonal-shaped cross sections, for example, pentagonal-shaped cross section, as well as the aforementioned quad-shaped cross section shown in FIG. 3.

Figure 9:
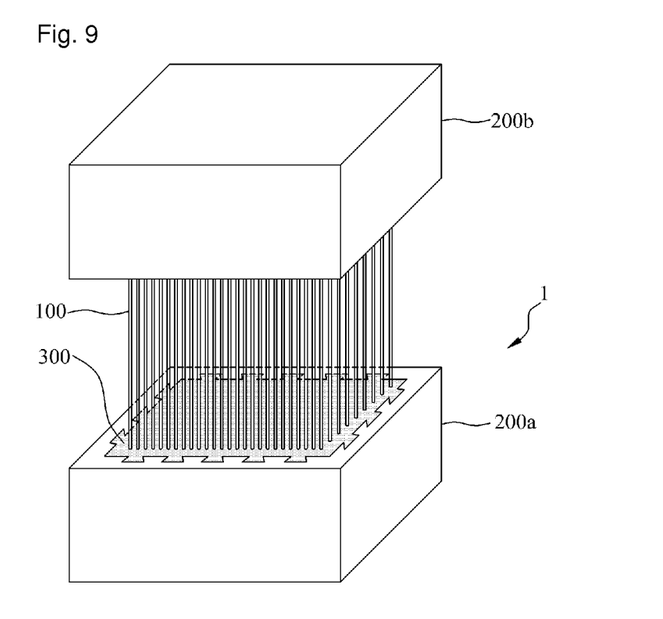
FIG. 9 is a perspective view illustrating a hollow fiber membrane module according to another embodiment of the present invention.

FIG. 9 is a perspective view illustrating a hollow fiber membrane module according to another embodiment of the present invention. In case of the hollow fiber membrane module 1 of FIG. 9, plural hollow fiber membranes 100 are accommodated in a first module case 200a and a second module case 200b.

Referring to FIG. 9, a bundle of hollow fiber membranes 100 is formed by holding one-end portions of the plural hollow fiber membranes 100, and holding the other-end portions of the plural hollow fiber membranes 100, respectively, through the use of potting agent 300. At this time, the one-end portions of the plural hollow fiber membranes 100 are accommodated in the first module case 200a; and the other-end portions of the plural hollow fiber membranes 100 are accommodated in the second module case 200b. Accordingly, water permeated through hollows of the hollow fiber membranes 100 is collected inside the first and second module cases 200a and 200b. In this case, the first and second module cases 200a and 200b are provided with the same separation-preventing grooves 221 of the aforementioned embodiments.

The hollow fiber membrane according to the present invention can be readily applied to a submerged type module and an external pressure type module, whereby the hollow fiber membrane according to the present invention can be applied to the various types of water treatment methods.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A hollow fiber membrane module comprising:
    a module case comprising:
        a first inner surface;
        a second inner surface upwardly extending from one end of the first inner surface;
        a third inner surface downwardly extending from the other end of the first inner surface; and
        a fourth inner surface connected to the third inner surface,
    a bundle of hollow fiber membranes;

a first potting agent placed on the first inner surface to hold the hollow fiber membranes together closely; and a second potting agent for fixing the first potting agent and bundle of hollow fiber membranes into the module case, wherein the second inner surface includes at least one separation-preventing groove extending from one end of the second inner surface to the other end thereof along a longitudinal direction of the hollow fiber membranes, wherein the at least one separation-preventing groove is filled with the second potting agent and configured to prevent the hollow fiber membranes from being separated from the module case, and wherein the module case has an inner space for collecting filtrate produced by the hollow fiber membranes.

2. The hollow fiber membrane module according to claim 1, wherein the first potting agent is in contact with the first and second inner surfaces of the module case.

3. The hollow fiber membrane module according to claim 1, wherein the first potting agent is in contact with the first and third inner surfaces of the module case.

4. The hollow fiber membrane module according to claim 3, wherein the first potting agent is not in contact with the second inner surface of the module case.

5. The hollow fiber membrane module according to claim 1, wherein the separation-preventing groove comprises:

an inlet provided on an extended surface of the second inner surface; and a room for defining the separation-preventing groove together with the inlet, wherein, on assumption that a width is defined with reference to a line parallel to the second inner surface, a width of the room is larger than a width of the inlet.

6. The hollow fiber membrane module according to claim 1, wherein the separation-preventing groove comprises:

a first inlet provided on an extended surface of the second inner surface; and a first room, a second inlet, and a second room sequentially arranged after the first inlet, wherein, on assumption that a width is defined with reference to a line parallel to the second inner surface, a width of the second room is larger than a width of the second inlet.

7. The hollow fiber membrane module according to claim 1, wherein the module case has a polygonal-shaped or curvilinear-shaped cross section when the module case is cut in a direction perpendicular to the longitudinal direction of the hollow fiber membrane.

8. The hollow fiber membrane module according to claim 1, wherein the hollow fiber membrane module comprises a pair of the module cases and both ends of each of the hollow fiber membranes are accommodated in the module cases, respectively.

* * * * *